United States Patent [19]
Allen et al.

[11] Patent Number: 5,812,713
[45] Date of Patent: Sep. 22, 1998

[54] OPTICAL COUPLING SYSTEM WITH BEND

[75] Inventors: Gary R. Allen, Chesterland; William J. Cassarly; John M. Davenport, both of Lyndhurst; Richard L. Hansler, Pepper Pike, all of Ohio

[73] Assignee: General Electric Company, Schenectady, N.Y.

[21] Appl. No.: 530,651

[22] Filed: Sep. 20, 1995

[51] Int. Cl.$^6$ .................................................. G02B 6/34
[52] U.S. Cl. ............................................. 385/39; 385/43
[58] Field of Search .................... 385/31–34, 36, 385/39, 43–48, 146, 15, 23, 116–117, 121

[56] References Cited

U.S. PATENT DOCUMENTS

| | | | |
|---|---|---|---|
| 3,453,036 | 7/1969 | Swope et al. | 350/96 |
| 3,870,396 | 3/1975 | Racki et al. | 385/24 |
| 4,411,490 | 10/1983 | Daniel | 385/126 |
| 4,540,237 | 9/1985 | Winzer | 385/126 |
| 4,708,423 | 11/1987 | Erman et al. | 385/126 |
| 5,305,401 | 4/1994 | Becker et al. | 385/24 |
| 5,341,445 | 8/1994 | Davenport et al. | |
| 5,604,837 | 2/1997 | Tanaka | 385/147 |

OTHER PUBLICATIONS

Cassarly et al., "Distributed Lighting Systems: Uniform Light Delivery," Reprint from Fiberoptics for Automotive Lighting (SP–1081), SAE: The Engineering Society for Advanced Mobility Land Sea Air and Space, International Congress and Exposition, Detroit, Michigan, Feb. 27, 1995–Mar. 2, 1995.

*Primary Examiner*—John D. Lee
*Assistant Examiner*—Ellen Eunjoo Kang
*Attorney, Agent, or Firm*—George E. Hawranko

[57] ABSTRACT

Disclosed are optical couplers and optical coupling systems for coupling a source of non-coherent light to a light distribution harness, wherein the couplers are polygonal in cross section to increase light mixing. The couplers have inlet and outlet arms, and an intermediate bend region configured to achieve compactness and minimal light loss through the bend region. In one embodiment, the bend region is an integral part of the coupler, with the inlet arm having a different cross-sectional dimension from the outlet art in such manner that substantially all light directed from the inlet portion to the bend portion reaches the outlet arm portion, and light rays parallel to the inlet axis are reflected in the bend portion to be directed substantially parallel to the outlet axis. In a second embodiment, the bend region comprises a prism having a pair of parallel spaced surfaces, and inlet, outlet, and third surfaces that are non-parallel to the spaced surfaces. The inlet arm projects from the inlet surface, and the outlet arm projects from the outlet surface. One of the inlet and outlet surfaces forms a first interface with a first material having an index of refraction different from that of the prism, so that light rays within the prism totally internally reflect from the first interface.

10 Claims, 9 Drawing Sheets

OPTICAL COUPLING SYSTEM WITH BEND

FIELD OF THE INVENTION

The present invention relates to optical couplers and optical coupling systems for coupling a source of non-coherent light to a light distribution harness, wherein the couplers are polygonal in cross section to increase light mixing and incorporate a bend to achieve compactness. More particularly, the present invention relates to the foregoing optical couplers and optical coupling systems wherein light is transmitted through the bend with minimal light loss.

BACKGROUND OF THE INVENTION

Optical coupling systems employing polygonal optical couplers are known, for instance, from U.S. Pat. No. 5,341,445 issued to J. Davenport and R. Hansler (also present inventors), and assigned to the present assignee. The '445 patent teaches the use of optical couplers for receiving light from a high brightness light source, and outputting the light into distribution harnesses for routing the light to remote optics. In particular, the '445 patent teaches the use of optical couplers whose cross sections are polygonal, e.g., square, rectangular, triangular, or hexagonal. Light from a non-coherent light source that passes into an inlet end of a polygonally shaped coupler becomes mixed to a high degree before passing through an outlet end into a light distribution harness for distribution to output optics (i.e., remote optical fixtures). The highly mixed light exhibits a high degree of uniformity in intensity and color, which is required in many lighting applications.

Using the polygonal couplers of the '445 patent, a desirable degree of light mixing can be achieved if the length of a coupler is sufficiently long. For instance, this may occur in a square, hollow, coupler having a length-to-cross section ratio of 7:1 where the coupler is used in a photographic slide projector or video projector. If the coupler were straight, the overall length of the slide or video projector would be correspondingly long.

One approach to minimizing the length of a coupler is to incorporate a (e.g. 90-degree) bend in the coupler. An initial approach to incorporating a bend in a coupler that is, for instance, square is to form a bend with a bend portion and inlet and outlet arms that are both square. The present inventors have discovered, however, that light transmission through such a coupler is less efficient than can be realized, due to light loss in the bend portion of the coupler.

SUMMARY OF THE INVENTION

It is therefore an object of the invention to provide rectangular optical couplers incorporating a bend and optical coupling systems using such couplers that more efficiently couple light from a source of light to a light distribution harness than the foregoing approach.

A first embodiment of the invention provides, in preferred form a coupling member for use in coupling non-coherent light from a source of light to a light distribution harness. The coupling member incorporates a bend, and includes a light transmissive body having an inlet arm for receiving light from the light source, and an outlet arm for providing light to a leading end of a light distribution harness. The light transmissive body further includes a bend portion from which the inlet and outlet arm portions project. The inlet and outlet arm portions have respective central longitudinal inlet and outlet axes which intersect in the bend portion to define a bend plane. The inlet arm portion has a cross section, with respect to the inlet axis, that is rectangular. A pair of inlet sides of the inlet arm portion are parallel to the bend plane. The outlet arm portion has a cross section, with respect to the outlet axis, that is rectangular. A pair of outlet sides of the outlet arm portion are parallel to the bend plane. The cross-sectional width of the pair of inlet sides at a position adjacent the bend portion is dimensioned smaller than the cross-sectional width of the pair of outlet sides at a position adjacent the bend portion in such manner that substantially all light directed from the inlet portion to the bend portion reaches the outlet arm portion, and light rays parallel to the inlet axis are reflected in the bend portion to be directed substantially parallel to the outlet axis. The foregoing coupling member may be incorporated into an optical coupling system including the mentioned source of non-coherent light.

A second embodiment of the invention provides, in preferred form, a coupler arrangement for use in coupling non-coherent light from a source of light to a light distribution harness. This coupler arrangement incorporates a bend, and includes a light transmissive body having an inlet arm for receiving light from the light source, and an outlet arm for providing light to a leading end of a light distribution harness. The inlet and outlet arms each have a respective rectangular cross section along an associated central longitudinal axis of the arm. A bend portion is included and comprises a prism having a pair of parallel spaced surfaces, and inlet, outlet, and third surfaces that are non-parallel to the spaced surfaces. The inlet arm projects from the inlet surface, and the outlet arm projects from the outlet surface. One of the inlet and outlet surfaces forms a first interface with a first material having an index of refraction different from that of the prism, so that light rays within the prism totally internally reflect from the first interface.

BRIEF DESCRIPTION OF THE DRAWINGS

The foregoing, and further, objects and advantages of the invention will become apparent from the following description when read in conjunction with the drawing, in which like reference characters designate like or corresponding parts throughout the several views, and in which.

DETAILED DESCRIPTION OF THE PREFERRED EMBODIMENTS

In the following description, terms such as "top," "bottom," "left," and "right" are used for convenience and are not to be construed as limiting terms.

Figure 1:
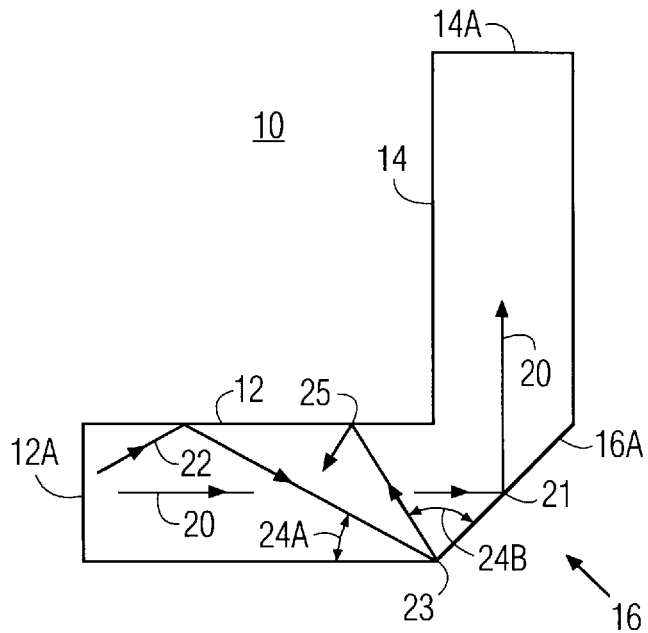
FIG. 1 is a top plan view of a prior art optical coupling member incorporating a bend to achieve compactness.

To better illustrate the high optical efficiency achieved by optical couplers of the present invention, a less efficient coupler 10 is first described with respect to prior art FIG. 1. Such figure shows a top view of a coupler 10 having an input arm 12 for receiving light from a light source (not shown), an output arm 14 for outputting light to a distribution harness (not shown), and a bend portion 16 for achieving a 90-degree bend.

Figure 1A:
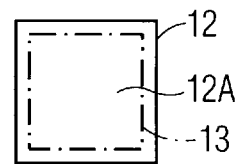
FIGS. 1A and 1B respectively show side views of inlet region 12A and outlet region 14A of FIG. 1.
Figure 1B:
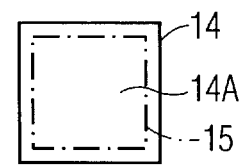

Side views of inlet region 12A of inlet arm 12, and of outlet region 14A, are respectively shown in FIGS. 1A and 1B. Such surfaces are square and of equal size to each other as shown in FIGS. 1A and 1B. If coupler 10 is hollow, phantom lines 13 and 15 in FIGS. 1A and 1B, respectively, represent interiorly reflecting surfaces; if, alternatively, coupler 10 is a transparent solid, surfaces 13 and 15 are not present.

As shown in FIGS. 1A and 1B, the square shape of inlet and outlet surfaces 12A and 14A (and of the remainder of inlet and outlet arms 12 and 14) facilitates the mixing of light that is passed through coupler 10, in the manner described, for instance, in the above-mentioned U.S. Pat. No. 5,341,445 445. Increased light mixing results in increased uniformity of intensity and color of output light, and also less critical alignment of the light coupled into the coupler.

In some applications, the length of coupler 16 needs to be some multiple of the cross-sectional dimension of the coupler; for example, a 7:1 ratio is desirable where the coupler is used in a photographic slide projector or video projector (not shown). To minimize the size of the resulting slide or video projector, it is desirable to include a bend portion 16 so that coupler 10 can be compact. An exemplary bend of 90 degrees, for instance, is illustrated, although other bend angles can be used.

In forming bend portion 16, a 45-degree, mirrored surface 16A is used to provide for reflection of light ray 20, which is directed along the central longitudinal axis (not shown) of inlet arm 12, and is reflected upwardly as shown at point 21, along the central longitudinal axis (not shown) of outlet arm 14. It is desired that further light ray 22, which is angled with respect to the longitudinal axis of inlet arm 12, pass into outlet arm 14. Ray 22, however, after reflecting from mirrored surface 16A at point 23 (angles 24A and 24B being equal), reflects rearwardly in inlet arm 12, i.e., back towards inlet region 12A The inability to pass ray 22 into outlet arm 14 lowers the optical efficiency of coupler 10, reducing the intensity of light output from outlet arm 14.

Figure 2:
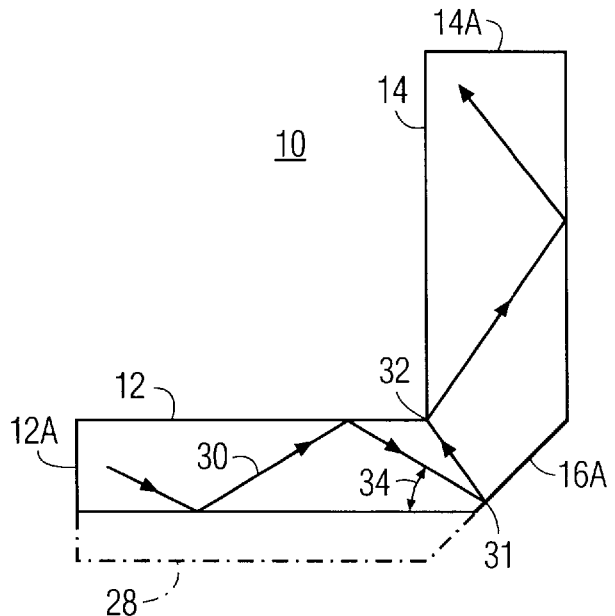
FIG. 2 is similar to FIG. 1, showing an optical coupling member according to the invention.

In accordance with a first embodiment of the invention, FIG. 2 shows a coupler 10, which, like coupler 10 of FIG. 1, has an input arm 12 for receiving light, an output arm 14, and a bend portion 16 for achieving, e.g., a 90-degree bend. Side views of inlet region 12A of inlet arm 12, and of outlet region 14A, are respectively shown in FIGS. 2A and 2B; such side views are similar to the above-described side views of surfaces 12A and 14A of FIGS. 1A and 1B. However, a dimension of inlet region 12A is reduced compared to the dimensions of outlet region 14A. That is, while corresponding input and output dimensions D2 and D4 are shown as equal, input dimension D1 is reduced from corresponding output dimension D3. Such change in dimension occurs on the sides of inlet arm 12 that are parallel to a plane (not shown) defined by the intersection of the respective central longitudinal axes (not shown) of inlet and outlet arms 12 and 14. Details of such reduction in dimension will be set forth below.

Figure 2A:
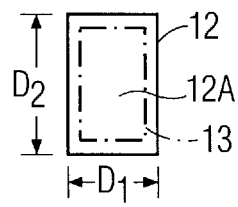
FIGS. 2A and 2B show side views of inlet region 12A and outlet region 14A of FIG. 2.
Figure 2B:
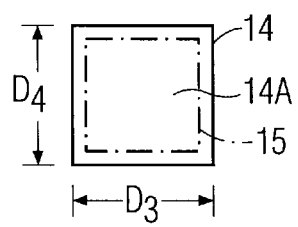

In the embodiment shown in FIGS. 2 and 2B, outlet arm 14 has a square and uniform cross section along its longitudinal axis, whereby dimensions D3 and D4 in FIG. 2B are the same. Such dimensions, however, may alternatively be different from each other, whereby the cross section of outlet arm 14 would be rectangular. Further, inlet arm 12 is shown in FIGS. 2, and 2A as being rectangular and uniform in cross section along its length; alternatively, it could be square. Moreover, one or both of inlet and outlet arms 12 and 14, rather than being uniform along their lengths, could be tapered in a manner known per se in the art to achieve an angle-to-area conversion of light. In such conversion, considering a single input or output arm, the angle is with respect to the longitudinal axis of the arm, and the area refers to the respective cross sectional areas of light at the inlet and outlet portions of the arm. Where an especially large angle-to-area conversion is desired, the tapers may each define a compound parabolic reflector made in accordance with non-imaging optics, a technology known per se in the art.

Referring again to FIG. 2, a phantom line 28 shows the portion of inlet arm 12 that is absent in relation to inlet arm 12 of FIG. 1. The extent of the absent portion, i.e., the reduction to dimension D1 for inlet arm as shown in FIG. 2A, is determined by the goal of transmitting all light rays through coupler 10, from inlet region 12A to outlet region 12A. Thus, light ray 30, which reaches 45-degree, mirrored surface 16A at point 31, reflects at point 32 within outlet arm 14, to pass upwardly and be transmitted though outlet region 14A. With light ray 30 representing light deviating from the longitudinal axis (not shown) of inlet arm 12 at a maximum angle 34, determining the reduced dimension D1 (FIG. 2A), compared to dimension D3 of outlet arm 14 (FIG. 2B), is a matter of geometry. For the example shown, with a 90-degree bend in the coupler, D1=D3 (1+tangent of angle 34).

Figure 3:
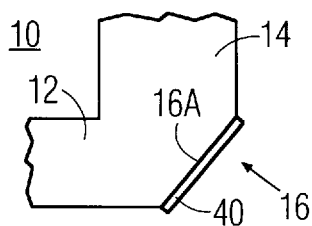
FIG. 3 is a detail view of a bend portion of the coupler of FIG. 2.

FIG. 3 is a detail view of bend portion 16 of a coupler 10, and of adjacent portions of inlet and outlet arms 12 and 14 of the coupler. A so-called backup, or separate, mirror 40 is shown mounted on angled surface 16A of the bend, and is preferably used rather than a mirrored surface 16A as described with the above embodiments where coupler 16 is a solid, rather than hollow, in construction. This is because a thin air layer that will exist between surface 16A and the mirror will cause much of the light reaching angled surface 16A to totally internally reflect within bend portion 16. As opposed to such lossless change of direction, about one-third of the light reaching surface 16A will be angled such that it passes outside of surface 16A to be reflected by the backup mirror, resulting in only one-third of the light having a mirror-absorbed light loss on the order of ten percent.

Figure 4:
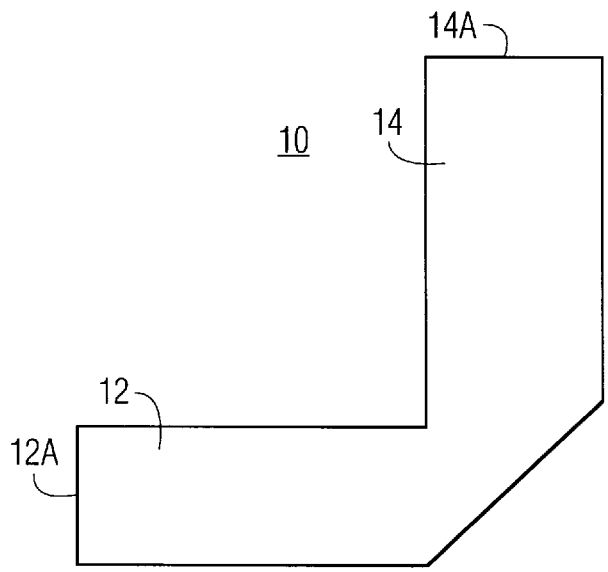
FIG. 4 is similar to FIG. 2, showing an optical coupling member according to a particular embodiment of the invention.
Figure 4A:
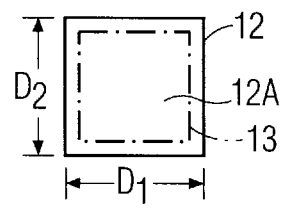
FIGS. 4A and 4B show side views of inlet region 12A and outlet region 14A of FIG. 4.
Figure 4B:
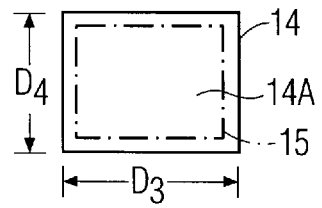

FIG. 4 shows a coupler 10 whose inlet region 12A is square, as shown in FIG. 4A, and whose outlet region 14A is rectangular, as shown in FIG. 4B. For use in projecting video images from a photographic slide or liquid-crystal display (not shown), the aspect ratio of output dimension D3 to D4 (FIG. 4B) is typically 1.3:1. Determining the dimension D1 of inlet arm 12 (FIG. 4A), compared to dimension D3 of outlet arm 14 (FIG. 4B), can be accomplished in the same manner as determining the corresponding dimensions with respect to the embodiment of FIGS. 2, 2A and 2B, as described above.

Figure 5A:
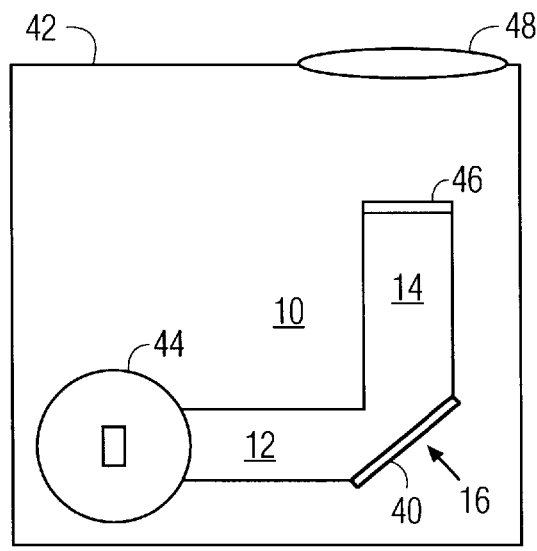
FIGS. 5A and 5B respectively show top and side plan views of an optical coupling system using the coupler of FIGS. 4, 4A and 4B.
Figure 5B:
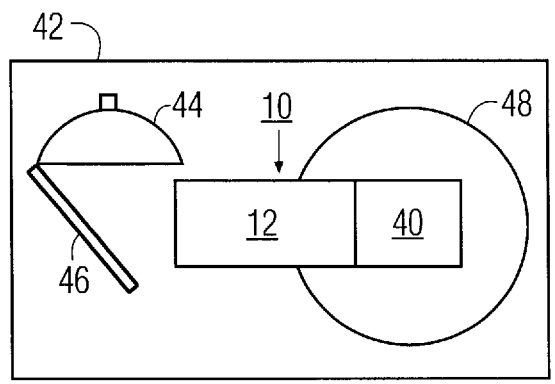

FIGS. 5A and 5B respectively show top and side plan views of an optical coupling system using the coupler of FIGS. 4, 4A and 4B. Within an enclosure 42, coupler 10 is arranged to receive light in inlet arm 12 from a source of light 44, via a mirror 46 shown in FIG. 5B. After passing through coupler 10 to achieve a high degree of light mixing, light passes though an image-containing plate 46 before being directed, via a projection lens 48, to display optics (e.g., a viewing screen). In a limiting case, the image-containing plate is perfectly transparent, and the system is used for projecting a uniform area of light.

Figure 6:
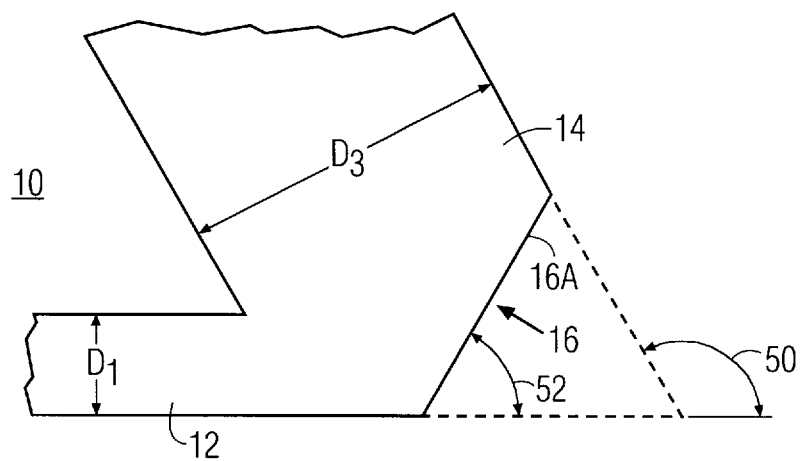
FIG. 6 is similar to FIG. 2, showing an optical coupling member with a 120-degree bend according to the invention.

FIG. 6 shows an optical coupler 10 including a bend portion 16 with a 120-degree bend, or angle 50. As a general rule, bend surface 16A is oriented at an angle 52 of half angle 50, or 60 degrees for the case shown. Determining the relation between dimension D1, of inlet arm 12, and D3, of outlet arm 14, is done in the same manner as mentioned above with respect to FIG. 2, 2A and 2B. For the 120-degree angle 50 shown, dimension D3 is approximately four times dimension D1; for larger angles 50, dimension D3 will be scaled even more upwardly with respect to dimension D1.

Figure 7:
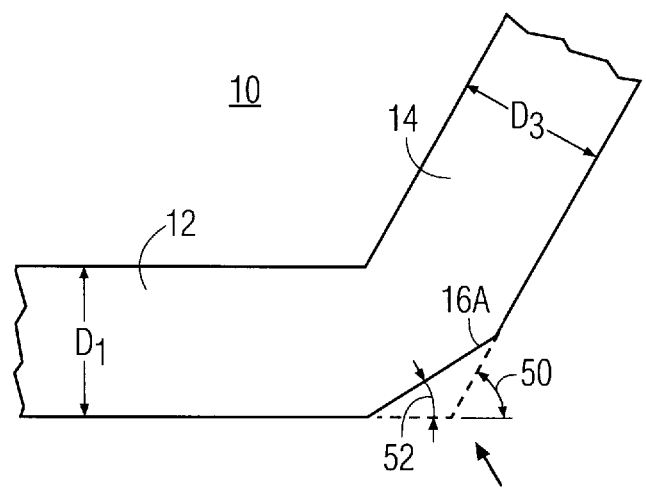
FIG. 7 is similar to FIG. 2, but showing a limiting case where the angle of bend is 60 degrees, and the dimensions of inlet and outlet arms is the same.

FIG. 7 shows a limiting case where dimension D3 of outlet arm 14 is the same as dimension D1 on inlet arm 12, and light rays directed into inlet arm 12 are all passed into outlet arm 14. In this limiting case, the angle 50 of bend is 60 degrees. For angles in excess of 60 degrees, dimension D3 will exceed dimension D1 as in the previous examples of the invention.

Figure 8:
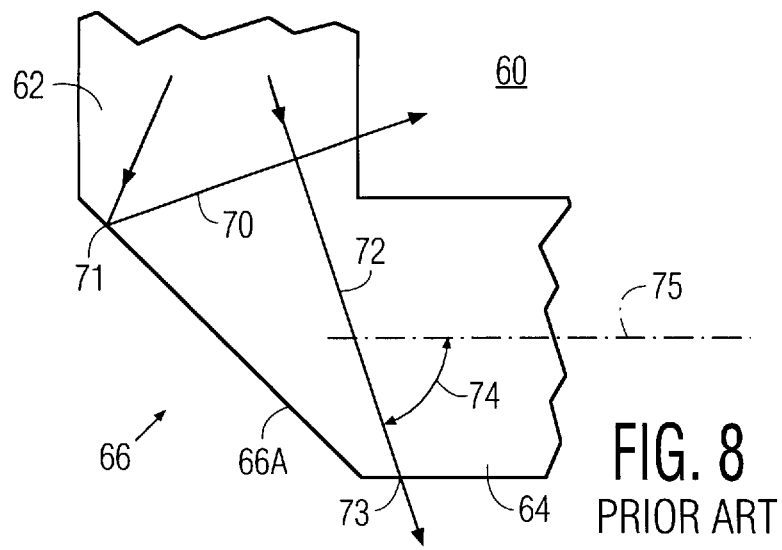
FIG. 8 is a top plan view of a fragmentary portion of a further prior art optical coupling member incorporating a bend to achieve compactness.
Figure 8A:
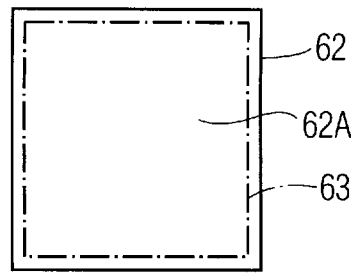
FIGS. 8A and 8B respectively show side views of an inlet region and an outlet region for the coupler of FIG. 8.
Figure 8B:
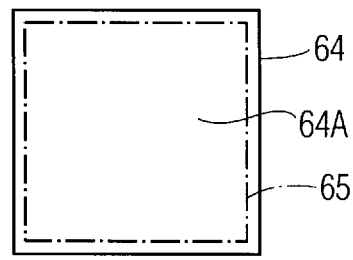

A further approach to forming a bend in an optical coupler is now described in connection with FIG. 8 and succeeding figures. FIG. 8 shows a prior art coupler 60 having input and output arms 62 and 64, and a bend region 66 with a mirrored surface 66A. As shown in FIGS. 8A and 8B, inlet arms 62 and 64 may have respective, square, equal-size ends 62A and 64A (not shown in FIG. 8). If coupler 60 is hollow, phantom lines 63 and 65 in FIGS. 8A and 8B, respectively, represent interiorly reflecting surfaces; if, alternatively, coupler 60 is solid, surfaces 63 and 65 are not present.

As shown in FIG. 8, a light ray 70 reflects from point 71 on mirrored surface 66A back into inlet arm 62, representing lost light. Similarly, light ray 72 passes straight through bend region 62 and exits output arm 64 at point 73; this is because the angle 74 it makes with respect to a central, longitudinal axis of outlet arm 64 is too high to allow the ray to totally internally reflect at point 73 back within outlet arm 64.

Figure 9:
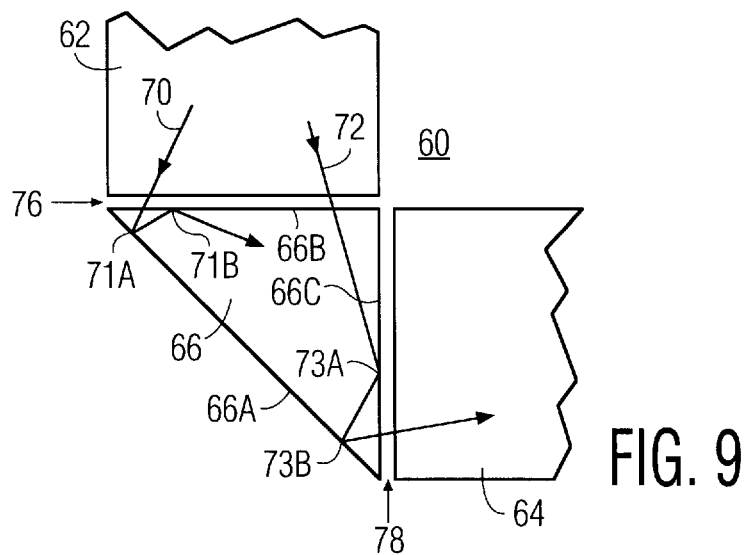
FIG. 9 is similar to FIG. 8, showing an optical coupling member according to a further embodiment of the invention.
Figure 9A:
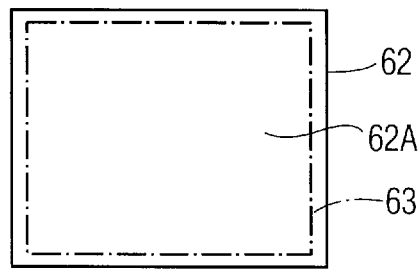
FIGS. 9A and 9B respectively show side views of an inlet region and an outlet region for the coupler of FIG. 9.
Figure 9B:
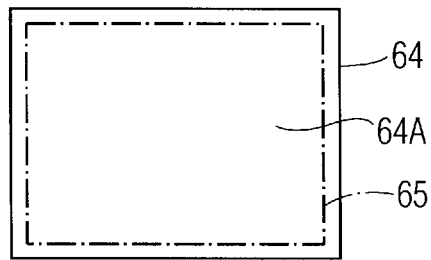

FIG. 9 shows an inventive coupler 60 which avoids the lost light of the coupler of prior art FIG. 8 described above. In FIG. 9, bend portion 66 comprises a prism with all surfaces polished, whose surface 66A may be mirrored if desired, as discussed below. Bend portion (or prism) 66 has an upwardly facing surface 66B, for receiving light from inlet arm 62, and a rightward facing surface 66C, through which light is passed into outlet arm 64. As shown in FIGS. 9A and 9B, inlet arms 62 and 64 may have respective, rectangular equal-size ends 62A and 64A (not shown in FIG. 9), although the ends may be square. If coupler 60 is hollow, phantom lines 63 and 65 in FIGS. 9A and 9B, respectively, represent interiorly reflecting surfaces; if, alternatively, coupler 60 is solid, surfaces 63 and 65 are not present.

Referring again to FIG. 9, a material 76 adjoins upwardly facing prism surface 66B and has an index of refraction differing from that of the prism. Likewise, a material 78 adjoins rightward facing surface 66C and has an index of refraction differing from that of the prism. Materials 76 and 78 may comprise air, or may comprise other materials whose selection will be routine to those of ordinary skill in the art based on the following optical conditions. Owing to the differing indexes of refraction of the prism and of materials 76 and 78, light ray 70 received within prism 66 can be reflected at point 71A either by a mirrored surface 66A or, preferably, by total internal reflection within the prism. After totally internally reflecting again in the prism at point 71B, ray 70 will pass into outlet arm 64 assuming the angle it make with prism surface 66C is above the maximum allowable angle for total internal reflection. In a similar manner, light ray 72 received into prism 66 totally internally reflects at point 73A in the prism, to be reflected at point 73B by a mirrored surface 66A, or preferably totally internally reflected, into outlet arm 64.

Prism 66 is preferably a triangular prism as shown in FIG. 9, for example. To minimize loss of light in the reflections within the prism, all of its surfaces should be polished, and beveling of its corners is preferably avoided. Input and output arms 62 and 64 to the prism may be square, as shown in FIGS. 8A and 8B, respectively, or rectangular, as shown in FIGS. 9A and 9B, respectively. Optimally, the input and output arms are of the same size and configuration, but differing sizes and configurations can be used if the attendant light loss is not prohibitive. Moreover, several input arms or several output arms can be used for a single prism, such as a bundle (not shown) of four output arms. Further, a single input arm may supply light to multiple (e.g. two) prisms (not shown), preferably stacked one atop the other; that is, referring to FIG. 9, a further prism (not shown) may be stacked beneath (or above) prism 66, with its output surface facing leftward and leading to a further output arm (not shown).

Figure 10:
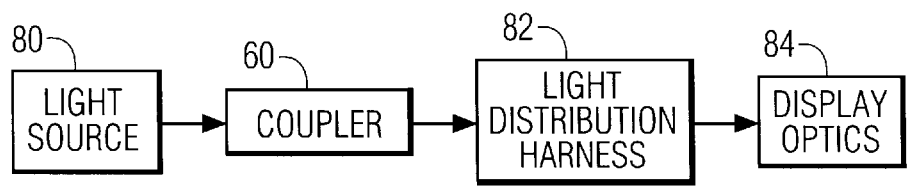
FIG. 10 is a schematic representation in block form of a light source coupled to output optics via an optical coupler and a light distribution harness.

FIG. 10 schematically shows how light from a light source 80 is passed to display optics 84, via coupler 60 and a light distribution harness 82. Details of suitable light distribution harnesses will be apparent to those of ordinary skill in the art from, e.g., the above-cited U.S. Pat. No. 5,341,445. For instance, a light distribution harness may comprise a bundle (not shown) of optical light conductors. Alternatively, for instance, it may comprise a photographic slide and a projection lens (not shown) for modulating and routing light to display optics such as a viewing screen (not shown).

Figure 11:
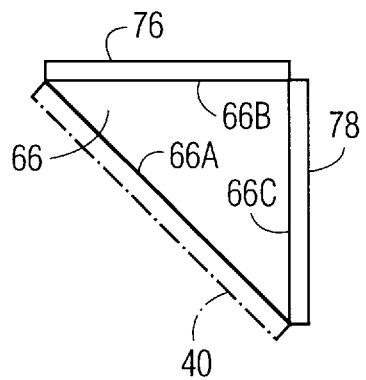
FIG. 11 is a top view of a prism showing various modifications according to the invention.

FIG. 11 illustrates preferred features of a prism 66. A mirrored, reflecting surface may be provided on the angled surface 66A of the prism. It preferably is a separate, so-called backup mirror 40 (shown in phantom) attached to the prism in a manner allowing an air interface between the mirror and the prism. This is for the reduced light loss explained above in connection with FIG. 3.

Figure 12:
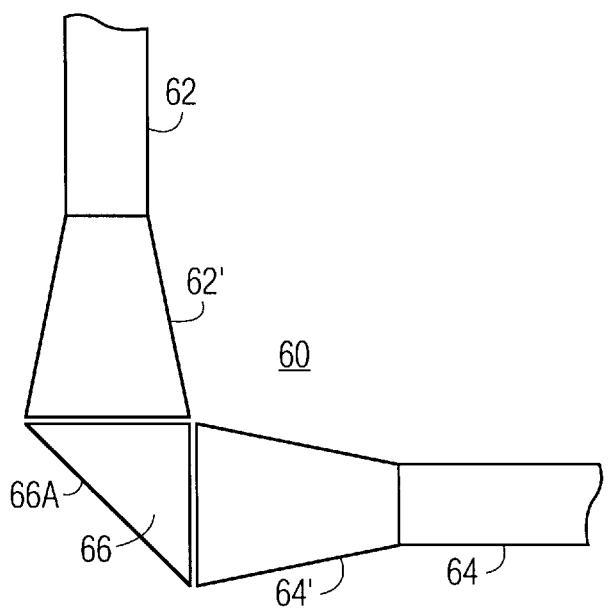
FIG. 12 is a top plan view of an optical coupler incorporating tapered sections according to another embodiment of the invention.

FIG. 12 shows a variation of the invention, where a coupler 60 includes a tapered inlet arm portion 62' and a non-tapered inlet arm portion 62; and preferably also includes a tapered outlet arm portion 64' and a non-tapered inlet arm portion 64. The tapers of inlet and outlet portions 62' and 64' achieve, in a manner known per se in the art, an angle-to-area conversion of light. In such conversion, considering a single input or output arm, the angle is with respect to the longitudinal axis of the arm, and the area refers to the respective cross sectional areas of light at the inlet and outlet portions of the tapered arm portion. Where an especially large angle-to-area conversion is desired, the tapers may each define a compound parabolic reflector made in accordance with non-imaging optics, a technology known per se in the art. Beneficially, in such embodiment, more light rays (not shown) become oriented so as to totally internally reflect within the prism on surface 66A, with essentially no light loss. If the light rays reflect off a mirrored surface 66A, on the other hand, a 5 to 10 percent light loss occurs.

Figure 13:
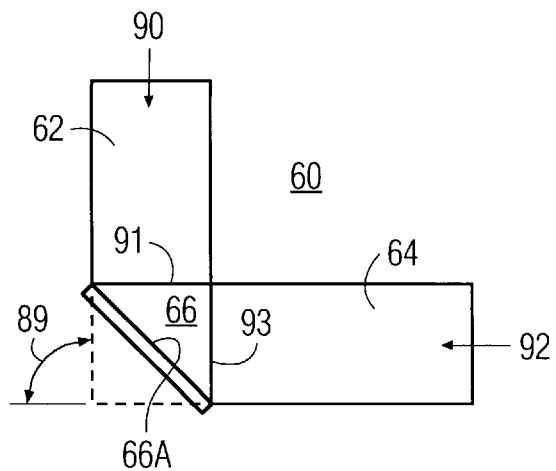
FIGS. 13 through 15 show upper plan views of optical couplers whose angle of bend, respectively, are orthogonal, acute and obtuse.
Figure 14:
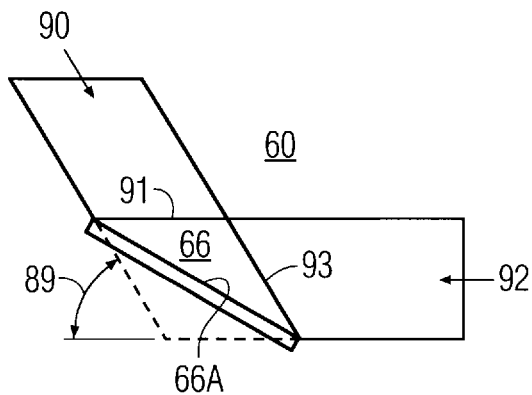
Figure 15:
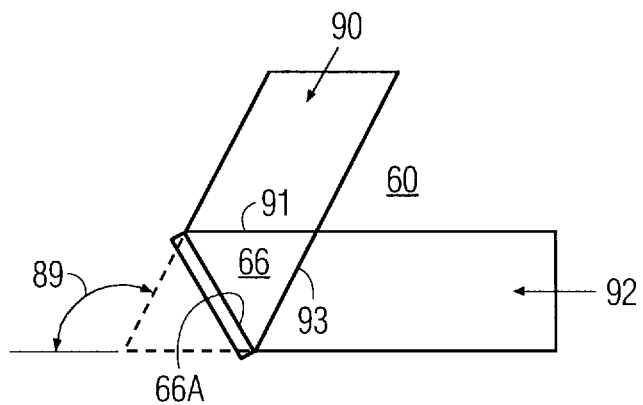

Optimal alignment of a prism with respect to input and output arms is now considered with respect to FIGS. 13 through 15. These figures respectively relate to the cases where the angle 89 of bend is orthogonal, acute and obtuse.

Referring to FIG. 13, a person looking into inlet arm 62 from the perspective or arrow 90 should see only the interior of inlet arm 62 and mirror 66A, assuming that interface 91 between arm and prism is transparent. Similarly, a person looking into outlet arm 64 from the perspective or arrow 92 should see only the interior of outlet arm 62 and mirror 66A, assuming that interface 93 between arm and prism is transparent. The same procedure can be applied to the acute-angle 89 and obtuse-angle 89 cases of FIGS. 14 and 15, respectively.

While the invention has been described with respect to specific embodiments by way of example, many modifications and changes will occur to those skilled in the art. It is, therefore, to be understood that the appended claims are intended to cover all such modifications and changes as fall within the true scope and spirit of the invention.

We claim:

1. A coupler arrangement for use in coupling non-coherent light from a source of light to a light distribution harness, said coupler arrangement incorporating a bend and comprising:

(a) a light transmissive arrangement including an inlet arm for receiving light from the light source, and an outlet arm for providing light to a leading end of a light distribution harness; said outlet arm having a rectangular cross section along an associated central longitudinal axis of said arm;

(b) a bend portion comprising a prism having a pair of parallel spaced surfaces, and inlet, outlet, and third surfaces that are non-parallel to said spaced surfaces; said inlet arm projecting from said inlet surface, and said outlet arm projecting from said outlet surface; and (c) one of said inlet and outlet surfaces forming a first interface with a first material, distinct from said inlet and outlet arm, having an index of refraction different from that of said prism, so that light rays within said prism totally internally reflect from said first interface.

2. The coupler arrangement of claim 1, wherein the other of said inlet and outlet surfaces forms a second interface with a second material, distinct from said inlet and outlet arm, having an index of refraction different from that of said prism, so that light rays within said prism totally internally reflect from said second interface.

3. The coupler arrangement of claim 1, wherein said bend portion is configured to achieve a non-perpendicular bend between said inlet and outlet arms.

4. The coupler arrangement of claim 1, wherein said bend portion is configured to achieve a perpendicular bend between said inlet and outlet arms.

5. The coupler arrangement of claim 1, wherein said first material comprises air.

6. The coupler arrangement of claim 1, wherein at least one of said inlet and outlet arms is tapered along its central longitudinal axis.

7. The coupler arrangement of claim 1, wherein an index of refraction of material forming said prism and an angle of bend formed between respective central longitudinal axes of said inlet and outlet arms are chosen so that said substantially all light rays reflecting from said third surface, within said prism, totally internally reflect from said surface.

8. The coupler arrangement of claim 1, in combination with said light source for supplying light to said inlet arm of said coupler.

9. The invention of claim 8, in further combination with a light distribution harness for distributing said light to display optics.

10. The coupler arrangement of claim 1, wherein said inlet arm has a rectangular cross section along an associated central longitudinal axis of said arm.

* * * * *